United States Patent [19]

Hewson

[11] Patent Number: 5,303,857
[45] Date of Patent: Apr. 19, 1994

[54] SWING-DOWN BICYCLE CARRIER FOR VEHICLES

[75] Inventor: Bruce C. Hewson, West Vancouver, Canada

[73] Assignee: Erling Peter Justesen, Langley, Canada

[21] Appl. No.: 944,219

[22] Filed: Sep. 11, 1992

[51] Int. Cl.⁵ .............................. B60R 9/06
[52] U.S. Cl. ...................... 224/42.03 B; 224/42.21; 224/282
[58] Field of Search ............. 224/282, 42.03 B, 42.08, 224/42.21

[56] References Cited

U.S. PATENT DOCUMENTS

| | | | |
|---|---|---|---|
| 4,400,129 | 8/1983 | Eisenberg | 224/42.03 B |
| 4,483,468 | 11/1984 | Lucas | 224/42.21 |
| 4,561,575 | 12/1985 | Jones | 224/42.21 |
| 4,971,237 | 11/1990 | Davis | 224/282 |
| 5,094,373 | 3/1992 | Lovci | 224/282 |

Primary Examiner—Renee S. Luebke
Attorney, Agent, or Firm—Klarquist, Sparkman, Campbell, Leigh & Whinston

[57] ABSTRACT

Existing bicycle carriers block access to the rear door or hatchback of a vehicle when attached to the rear bumper. The present invention provides a bicycle carrier attachable to a vehicle's rear trailer hitch which is pivotable to swing down from a vertical position to a lowered position to permit access to the rear door of the vehicle.

1 Claim, 4 Drawing Sheets

SWING-DOWN BICYCLE CARRIER FOR VEHICLES

TECHNICAL FIELD

The invention relates to apparatus for carrying bicycles on automobiles and other vehicles.

BACKGROUND ART

Existing carriers for carrying bicycles on an automobile are mounted on the roof or rear bumper of the vehicle. The bumper-mounted carriers have the advantage of making it easier and more convenient for the user to mount or remove the bicycle from the carrier. However, such carriers cannot be conveniently used on recreational or similar vehicles having hatchbacks, rear doors or tailgates, since the mounted carrier prevents access to such rear doors. There is therefore a need for a bicycle carrier which can be mounted to the rear bumper of a vehicle without preventing access to the rear tailgate or hatch of the vehicle.

DISCLOSURE OF INVENTION

The present invention provides a bicycle carrier attachable to a vehicle's rear trailer hitch which is pivotable to swing down from a vertical position to a lowered position to permit access to the rear door of the vehicle.

BRIEF DESCRIPTION OF DRAWINGS

In drawings which illustrate preferred embodiments of the invention.

BEST MODE(S) FOR CARRYING OUT THE INVENTION

Figure 1:
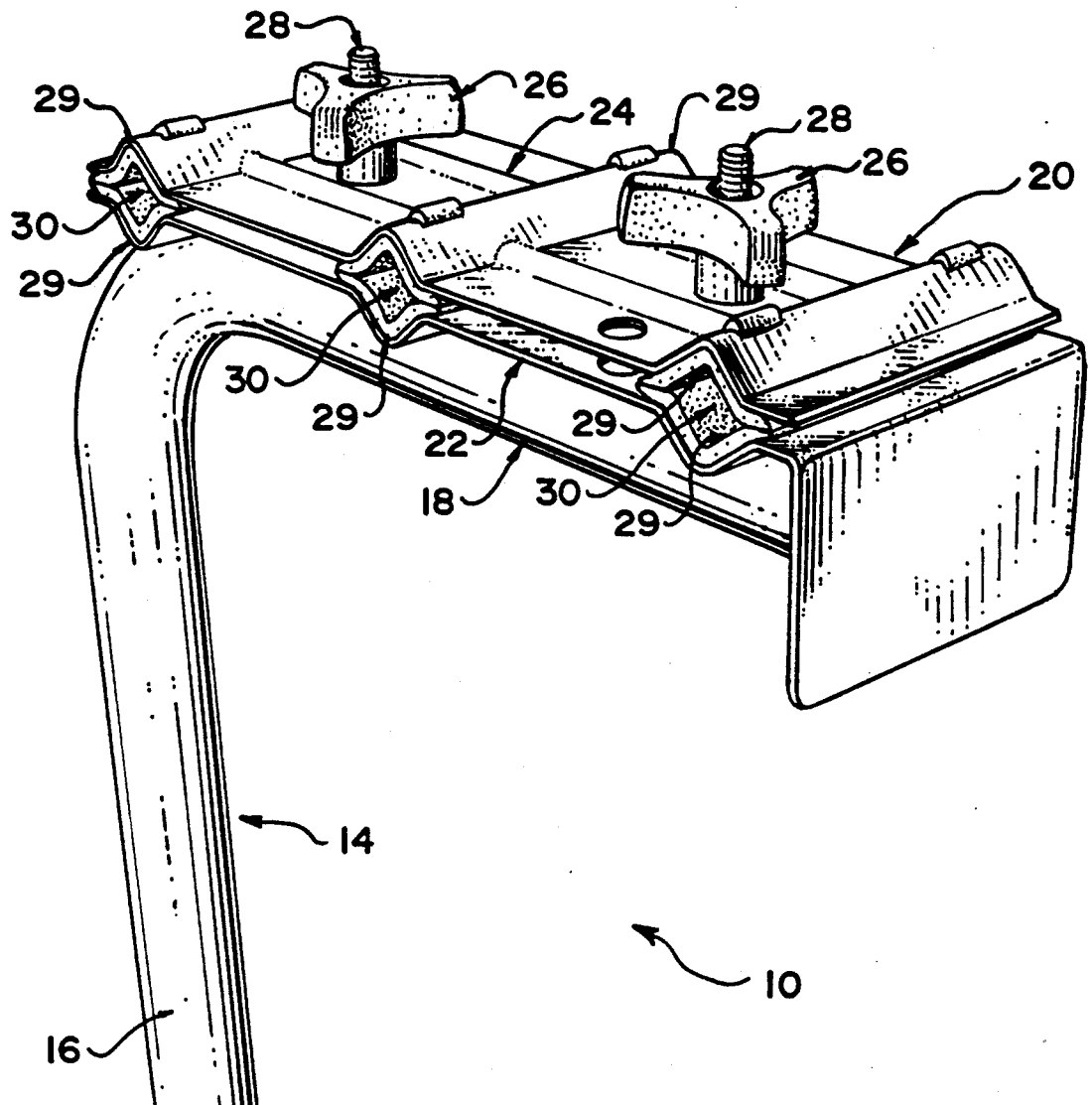
FIG. 1 is a perspective view of a first embodiment of the invention in the vertical position.
Figure 2:
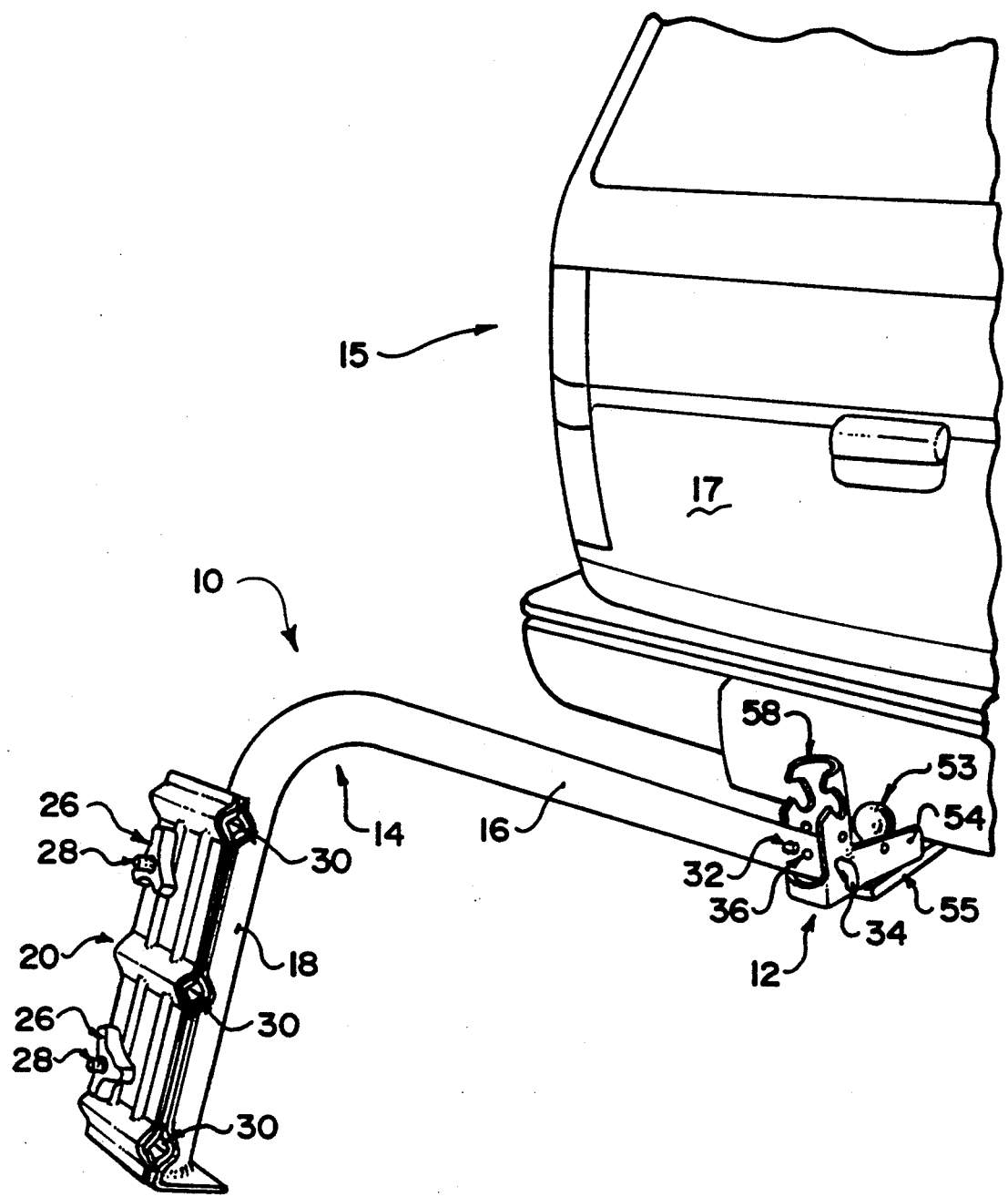
FIG. 2 is a perspective view of the embodiment of the invention shown in FIG. 1 attached to the trailer hitch of a vehicle and in the lowered position.
Figure 3:
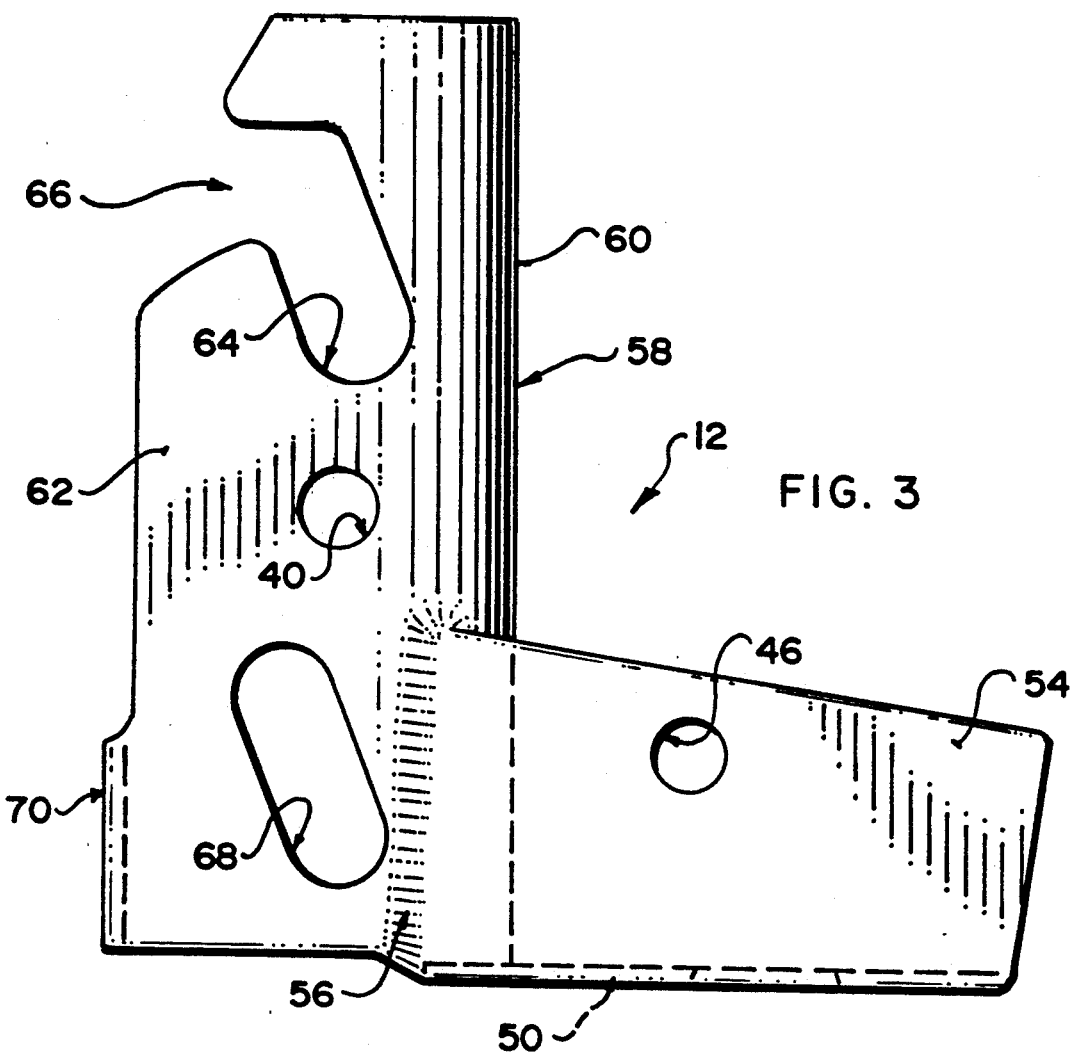
FIG. 3 is a side view of the bracket portion of the first embodiment of the invention.
Figure 4:
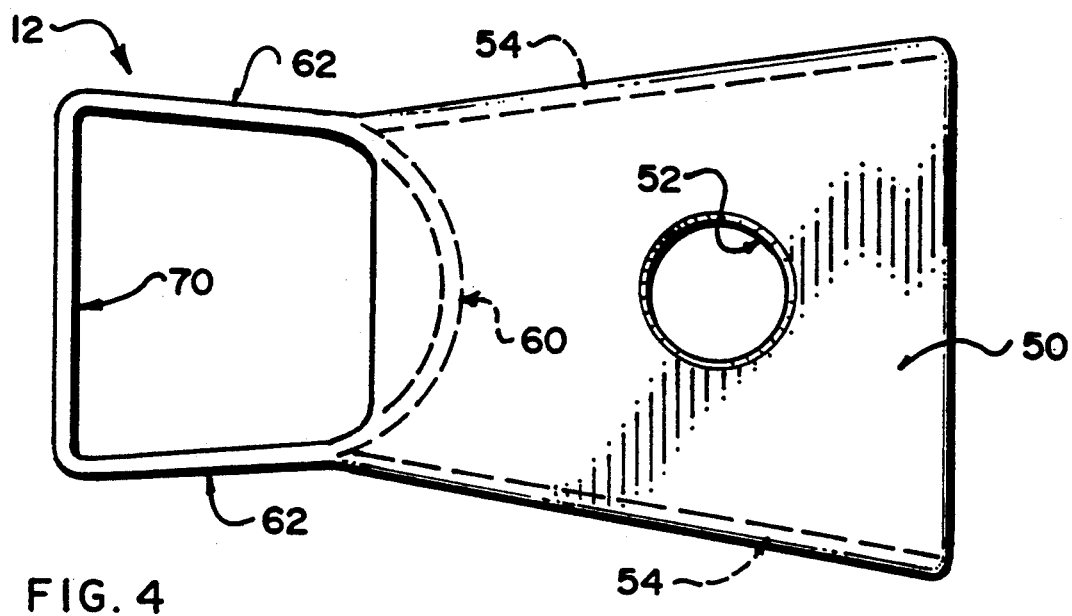
FIG. 4 is a bottom view of the bracket portion of the first embodiment of the invention.

With reference to the drawings, the swing-down bicycle carrier of the invention is designated generally by reference numeral 10 in FIGS. 1 and 2. It comprises a mounting bracket 12, an L-shaped support 14 consisting of vertical post 16 and horizontal support 18, and a bicycle clamp 20 secured to the upper surface of support 18. Clamp 20 consists of a bottom plate 22 which is attached to support 18 by welding or the like, and a top plate 24 which is tightened down against plate 22 by two nuts 26 which are threaded onto bolts 28 extending through holes in top plate 24. Plates 22 and 24 have three triangular grooves 29 which are arranged to form three parallel channels 30 perpendicular to support 18 when the two plates are secured together.

L-shaped support 14 is formed of a hollow steel pipe of about 3 inches in diameter which is bent to the desired shape. Bracket 12 is formed of a steel plate approximately 3/16 inch in thickness. The lower end of support 14 has two pins 32, 34 which extend diametrically through the support 14 and are welded securely in place with a short projection on either end. A hole 36 is provided in the lower end of support 14 between pins 32, 34 to receive a pin 38. Pin 38 slides freely through hole 40 in bracket 12 and corresponding hole 36 in support 14. It is connected by chain 42 to a ring 44 which is secured in bracket 12 through hole 46.

Figure 5:
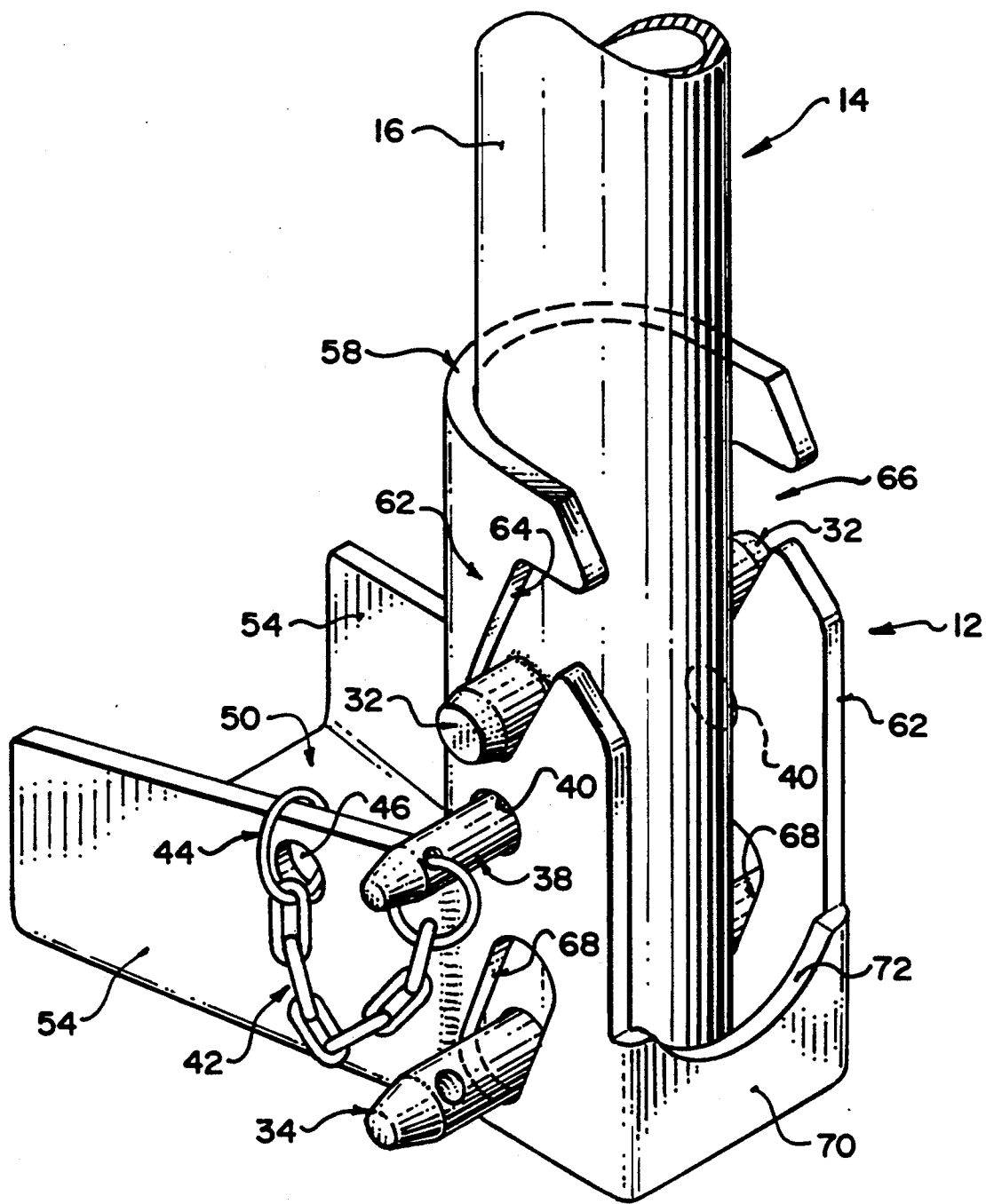
FIG. 5 is a detail perspective view of the bracket portion of the first embodiment of the invention.

Bracket 12 is illustrated in further detail in FIG. 5. It has a flat horizontally oriented flange 50 in which is provided a hole 52 for securing the bracket 12 to a trailer hitch by inserting the threaded neck of the trailer hitch ball 54 (FIG. 2) and threading it through hole 52 into the trailer hitch 55. Vertical walls 54 extend upwardly along either edge of flange 50, and are joined by welding along lines 56 to the outer surface of vertically-oriented bracket element 58. Element 58 has a rounded front 60, and two rearwardly extending sides 62. Each of sides 62 is provided with an elongated slot 64 for receiving pin 32. Slot 64 opens to mouth 66 through which pin 32 can be moved. Each side 62 also has a slot 68 for receiving pin 34, and a hole 40 as mentioned above, for receiving pin 38. A rear panel 70 having an upper rounded edge 72 extends between the lower rear edges of walls 62.

In use, flange 50 of bracket 12 is secured to the trailer hitch 55 of vehicle 15, with support 14 pivotally mounted in bracket 12 by pin 34. Support 14 is placed in the upright vertical position by lifting the support upwardly so that pin 34 moves to the uppermost position in slots 68, pivoting the support 14 towards flange 50 so that the pin 32 moves through mouths 66 and into slots 64, allowing the support to drop so that pins 32 and 34 move to the lowermost positions in slots 64, 68, and inserting pin 38 through holes 40 to secure the support 14 in the upright position. One, two or three bicycles can then be secured to clamp 20 by unscrewing nuts 26, removing top plate 24, placing the cross-bar or the bicycle in one of grooves 30, replacing top plate 24 and screwing down nuts 26. If access to the rear door 17 of the vehicle is desired, either when the bicycle is in place on the carrier or otherwise, then pin 38 is removed, the support 14 is lifted to move pin 32 into and through mouth 66, and support 44 is pivoted downwardly until the rear surface of post 16 bears against surface 72 which determines the maximum rearward rotation of support 14.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A bicycle carrier for mounting on a trailer hitch of a vehicle, said trailer hitch type having a removable ball secured to a threaded bolt portion, said carrier comprising:
   a) bracket means for attachment to said trailer hitch;
   b) an elongated generally L-shaped bicycle support means pivotally mounted at a first end thereof on said bracket means for movement from a fixed vertical position to unfixed rearward pivotal motion;
   c) means on said bicycle support means for removably attaching a bicycle; and
   d) means for releasably securing said support means in said fixed vertical position;

wherein said means for releasably securing said support means in said fixed vertical position comprises a pin which removably extends through a hole in said bracket means and a corresponding hole in said support means, wherein said support means is provided with axle means secured thereto and extending perpendicularly therefrom which extends into, rotates in and is movable along two parallel elongated slots in said bracket means, whereby said support means is rotatable in and vertically movable in said bracket means from a lower position in which said support is constrained in a fixed vertical position to an upper position in which said support is released for said rearward pivotal motion; and wherein said bracket comprises a generally horizontal planar element provided with a hole for receiving said bolt portion of said ball of said trailer hitch, and a second upstanding section which receives said support element and is provided with said elongated slots extending upwardly on either side thereof, said upstanding section being generally U-shaped in horizontal cross-section having a top, a rearward face and a forward face, said upstanding section being open on said top and along said rearward face to permit passage of said support element when said support element is in said upper position while being closed along said frontward face to prevent frontward pivotal movement of said support element when said support element is in said upper position.

* * * * *